Nov. 20, 1951     M. S. MERRILL     2,575,458

AUTO TOP CARRIER FOR SKIS, TOBOGGANS AND LIKE ARTICLES

Filed Dec. 5, 1946     2 SHEETS—SHEET 1

INVENTOR.
MARCELLUS S. MERRILL
BY WHITEHEAD & VOGL
PER Earle Whitehead
ATTORNEYS INVENTOR.
MARCELLUS S. MERRILL
BY WHITEHEAD & VOGL
PER Carl Whitehead
ATTORNEYS Patented Nov. 20, 1951

UNITED STATES PATENT OFFICE 2,575,458

AUTO-TOP CARRIER FOR SKIS, TOBOGGANS, AND LIKE ARTICLES

Marcellus S. Merrill, Denver, Colo.

Application December 5, 1946, Serial No. 714,314

10 Claims. (Cl. 224—42.1)

This invention relates to automobile-top carriers for skis, toboggans and like articles. The description will be in terms of skis.

An object of the invention is to provide improved means for seating a ski carrier upon and securing it to the top of an automobile.

A further object is to provide improved means for securing skis in an automobile-top carrier.

A further object is, in such a device, to provide a resilience associated with the means of securing the device to an automobile whereby the danger of accidental disengagement is practically eliminated, while providing for ease of manual engagement and disengagement.

A further object is to provide such a device which shall closely conform to the contour of the auto top to which it is attached and shall be of streamlined construction in order to minimize wind resistance, tending to disengage the carrier, when the automobile to which it is attached is proceeding at high speed.

A further object is to provide for positively securing the skis in the carrier while protecting the surfaces of the skis from injury and providing simple and easily and quickly manually-operated means for securing the skis within the carrier and disengaging them therefrom.

With the foregoing and other objects in view, all of which shall more fully hereinafter appear, the invention comprises certain novel constructions, arrangements and combinations of parts as will now be described and as defined in the appended claims and illustrated in the accompanying drawing wherein Fig. 1 is a conventional illustrative plan of a fragment of the top of an automobile with two units of the present invention secured thereto and two pairs of skis secured in such units.

Figure 1:
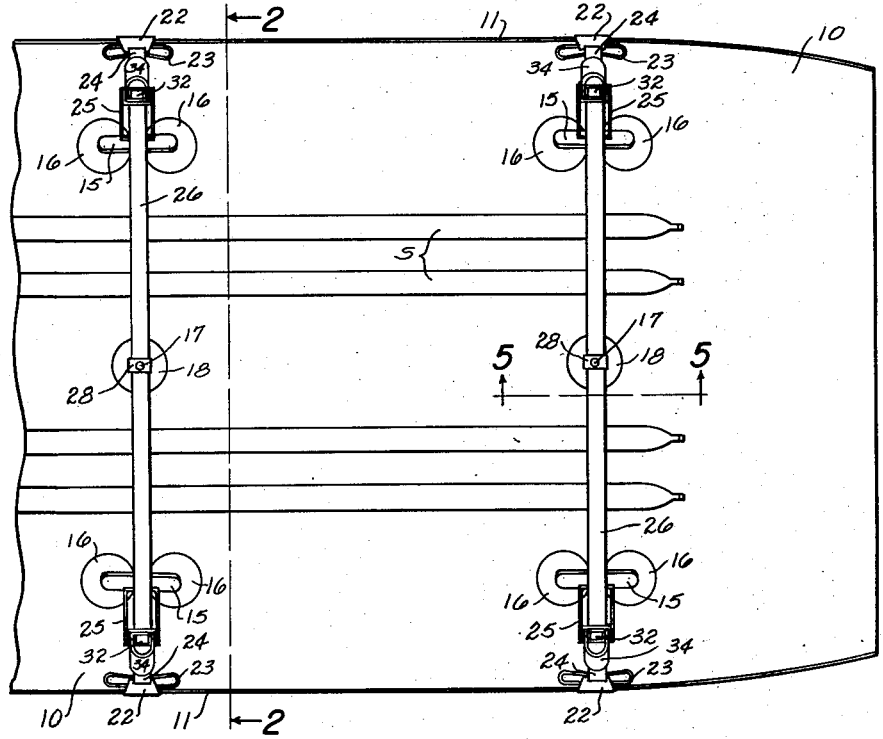

In the drawing an auto top is conventionally illustrated at 10 with the usual drip mold 11. My invention comprises carrying units, each of which is adapted to rest upon the auto top and to be secured in place by end engagements with the drip mold or other projection from or part of the auto available for such engagement. The present commonly-used drip molds provide, presently, the most satisfactory means for such engagement and this description will be in the terms thereof.

A unit of my invention comprises a main bar 12, preferably provided with a pad 13 of rubber or other suitable padding material to save the bottom surfaces of the skis from damage by contact with the bar 12, which bar is preferably made of spring steel or like material with looped or bent ends 14.

The ends of the loops 14 carry suction-cup brackets 15, which brackets carry suction cups 16, which, through such loops and brackets, suctionally and resiliently seat main bar 12 on the top 10 as illustrated at Figs. 1, 2, 3 and 4. The central portion of main bar 12 may be resiliently seated on the top 10 by means of center spring rod 17 whose bottom end is seated in or carries suction cup 18 upon whose top there is seated coiled spring 19 enclosing rod 17, the top of the spring seating against the under side of bar 12 as at 20, rod 17 projecting through bar 12 which has a sliding engagement with the rod whereby the central portion of bar 12 is resiliently supported by the cup 18 and the spring 19.

Figure 2:
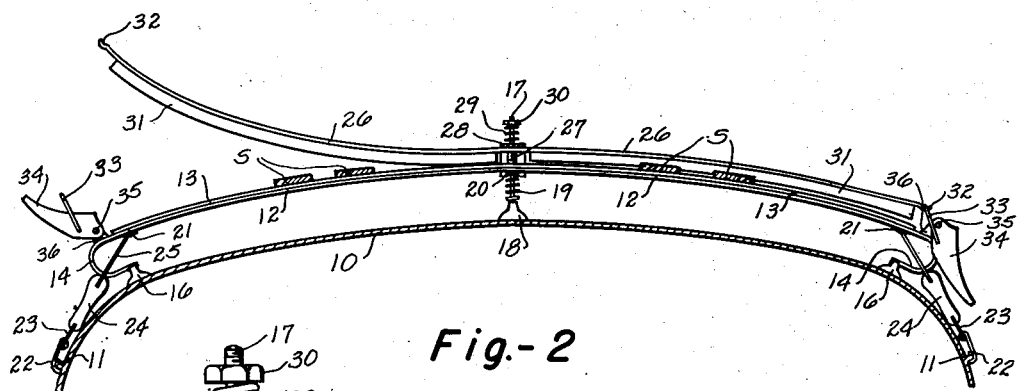
Fig. 2 is a view taken on line 2—2 of Fig. 1 conventionally showing the auto top in section and showing the left end of the top bar disengaged and, in section, a portion of the top bar aligning clamp.
Figure 7:
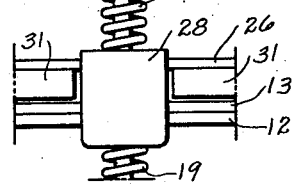
Fig. 7 is a fragmentary view, on enlarged scale, of the central portion of the structure shown at Fig. 2, showing the aligning clamp in elevation.
Figure 3:
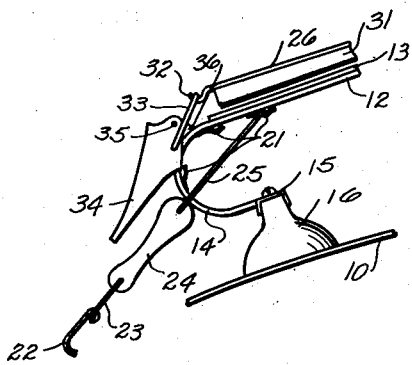
Fig. 3 is a side elevational, fragmentary view of one end of a unit showing in detail the parts there assembled.
Figure 4:
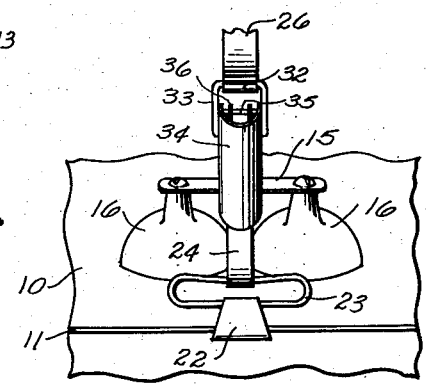
Fig. 4 is an end elevation view of the assembly shown at Fig. 3.
Figure 5:
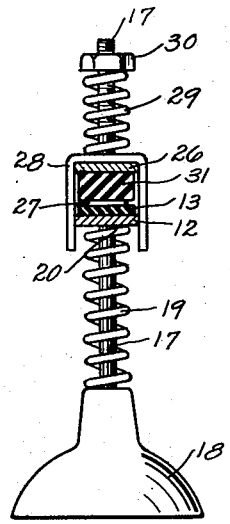
Fig. 5 is a view taken on line 5—5 of Fig. 1 but omitting the top of the auto.

The end portions of bar 12 are provided with clips 21, of which there are preferably a plurality as shown at Fig. 3, only one being shown at each end at Fig. 2. For engaging each end of the bar to the auto, I provide a hook 22 adapted to engage the drip mold 11 as illustrated at Figs. 1, 2 and 4, and link the hook to one of the clips 21 by means of a spring-loop-link 23, a link block 24, preferably of solid rubber or like material, and a link 25 adapted to engage one of the clips 21, as shown at Figs. 2 and 3. It will be understood that the connection of each of the elements 22, 23, 24 and 25 with the other permits an interrelative hinge movement of such interconnected elements so that in effect they form a block chain for releasably securing the bar 12, through one of the clips 21, to the drip mold 11. The link 24, being of rubber or like material, affords some resiliency to the chain as does also the spring-loop-link 23. The plurality of clips 21 affords a considerable adjustability according to varying heights of tops 10 above the molds 11. Further adjustability for this purpose is afforded by the resilience of the cups 16 and the loops 14, the result being an adjustability which permits the securing of one of my units to the top of any standard make of closed auto with a tightness, but with a resilience, that insures against accidental disengagement, by vibration, jolting, wind pressure or otherwise, but facilitates manual disengagement when desired.

Having described the base portion of a unit of my invention I shall now describe that portion which clamps the skis to the base. For this purpose I provide a top bar 26 mounted for vertical sliding on the rod 17 and which may be spaced from bar 12 by a suitable bushing 27. The later described pads will usually sufficiently provide spacing of the bars without the bushing. The top bar is held in line with bar 12 by an inverted U-shaped clamp 28 which seats over rod 17 and upon the top of top bar 26 with the sides of the U clamp projecting downwardly and engaging the sides of both bottom and top bars and thereby holding the top bar aligned with the bottom bar.

Seated upon clamp 28 and encircling rod 17 is coiled spring 29 which is seated at its upper end against adjustment nut 30 on the top, threaded, end of rod 17. Springs 19 and 29 together with nut 30 provide a mounting for bars 12 and 26 which is resiliently seated as to vertical movement in both directions but by means of which the expansive pressure of the springs may be readily adjusted as desired by simply turning the nut 30.

Top bar 26 is, in the preferred embodiment, made of spring steel or the like, with a normal upward curve as illustrated at the left at Fig. 2, and is provided on its under side with a pad 31 of comparatively thick, soft, resilient material such, for example, as sponge rubber. The ends of bar 26 are provided with suitable means, such as hooks 32, to engage link 33, pivoted to latch 34 which is pivoted, as at 35, to a lug 36 on bar 12, forming a toggle fastener, whereby, when the upwardly curved end of bar 26 is depressed to the position shown at the right at Fig. 2 and link 33 is seated in hook 32 and latch 34 is depressed to the position shown at Fig. 3 and at the right at Fig. 2, the end of bar 26 will be locked in said depressed position.

In operation the base is seated on the top of the auto, link 25 is engaged with the appropriate clip 21 and the end of bar 12 is manually depressed sufficiently to bring hook 22 into engagement with the drip mold 11, whereupon the downward pressure on the end of bar 12 is released and the resilience of bar 12 and its looped end, the resilience of links 23 and 24 and of cups 16, draws and maintains hook 22 into secure engagement with mold 11. This operation is, of course, performed with both ends of bar 12, whereupon the unit is securely, but resiliently, seated upon and secured to the top 10. Two units are thus secured to the auto as illustrated at Fig. 1. The skis to be carried are then laid on the pads 13 as indicated at S, Fig. 2, and the top bar is depressed and fastened in position shown at the right at Fig. 2 where it will be noted that the skis sink into and are partially encased by the pad 31 so that they are secured in position for carrying without danger of injury to their surfaces or change of their position.

Figure 6:
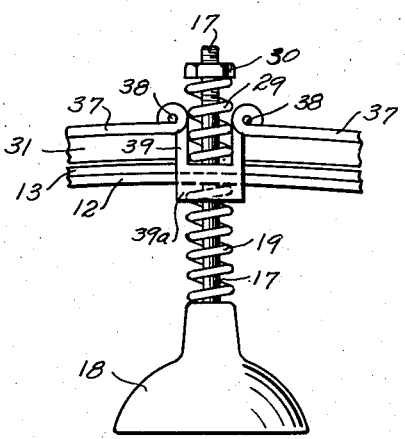
Fig. 6 is a view taken at right angles to Fig. 5 and illustrating a modified form of structure at the central portion of a unit.

A modified structure of the central assembly is illustrated at Fig. 6 wherein bar 12, pad 13, rod 17, cup 18, springs 19 and 29, nut 30 and pad 31 are the same as in the embodiment illustrated in the other figures and heretofore described.

In this modified form top bars 37 have their inner ends hinged at 38 to the upper termini of a U-shaped member 39 seated on bar 12 and having its base engaged with rod 17 and adapted for sliding vertically thereon. Depending lips 39a have a sliding fit along the edges of bar 12. Bushing 27 and clamp 28 are thereby eliminated, the hinge mounting and lips 39a maintaining alignment of bars 37 with bar 12. The resilience of bar 12, spring 29 and pad 31 permit the engagement of hook 32 with link 33 in this embodiment in the same manner as in the previously described embodiment.

Figure 8:
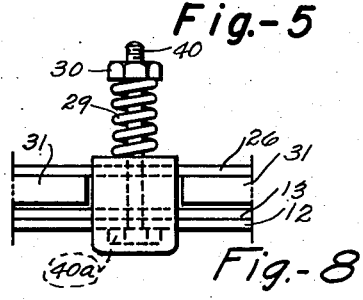
Fig. 8 is a view like Fig. 7 but showing a further modification of the central structure of a unit.

At Fig. 8 I have illustrated a further modification of the central structure of a unit of my invention. In this construction the cup 18 and spring 19 are eliminated and the central portion of main bar 12 is made stronger, by increased thickness or other appropriate means, to compensate for the absence of a central support. The rod 17 is replaced by bolt 40 having its head 40a seated against the under side of bar 12 and its shaft upstanding through bars 12 and 26 and carrying spring 29 and nut 30, the same as in the embodiment first described. While Fig. 8 illustrates single top bar 26 it will be obvious that as the only difference between the Fig. 8 embodiment and those previously described is that cup 18, spring 19 and the lower part of rod 17 are eliminated and bolt head 40a substituted and main bar 12 strengthened, these changes may be made with the hinged top bar embodiment, illustrated at Fig. 6, as well as with the previously described and illustrated single top bar construction.

It will be understood that with all embodiments the spring 29 permits any upward movement of the top bars, relative to the main bar 12, which may be required in order to accommodate any thickness of skis, toboggans, etc. which are clamped in the carrier, suitable adjustment of nut 30 being made.

It will be noted that, as illustrated at the left at Fig. 2, the top bars normally curve upwardly, thus opening the space between the pads 13 and 31 so that the user can, with one hand, lay the skis on the pads 13 of two units simultaneously at the appropriate position as there illustrated. Then still using only one hand, he can pull down the end of the top bar, flip link 33 into hook 32 and depress latch 34, thus locking the skis in position as shown at the right at Fig. 2. As the user frequently has to place the skis in the carrier when standing on ground that is icy or snow covered, requiring the use of one hand with which to steady himself, this single hand operation in placing and locking the skis is of great importance.

It will be seen from the foregoing description and the illustrations that this carrier, when in closed, carrying position, conforms to the top of the auto, presents a minimum of wind resistance, binds the skis within the carrier and the carrier to the auto most securely but that the resilient structure absorbs the vibrations and jolts and jars which would, otherwise, tend to disengagement of the carrier from the auto. Moreover all operations of engagement and disengagement may be performed manually and with the utmost ease and speed.

While I have illustrated in the drawing and herein described many details of construction, alternative and equivalent structures will readily occur to those skilled in the art and which are within the spirit and scope of the foregoing disclosure and the appended claims, and I am not to be limited in my protection to such illustrated and described details.

I claim:

1. An auto-top ski carrier unit comprising a base bar and a top bar structure, interengaged at their central portions, means for seating the base bar on and engaging it to the top of an automobile, the end portions of the top bar structure being normally curved upwardly and thereby separated from the base bar, the top bar being resilient and being thereby adapted for manual depression into substantial alignment with, and adjacent to, the base bar and means for releasably securing the top bar ends in said depressed adjacent position.

2. An auto top ski carrier unit comprising a base bar and a top bar structure, at least one of which is resilient, interengaged resiliently at their central portions, means for resiliently seating the base bar on and resiliently securing it to the top of an automobile, the ends of the top bar structure being normally spaced above and away from the base bar but adapted for manual depression toward and releasable securing to the ends of the base bar.

3. In a device as defined in claim 2, the means for resiliently securing the base bar to the auto top including suction cups carried by resilient means beneath the bar and adapted to seat upon and engage the top of the auto and chains, including resilient elements engaged at one end to said resilient cup-carrying means and, at their other ends, to the side of the auto.

4. An auto top ski carrier unit comprising a base bar and a top bar structure, at least one of which is resilient, interengaged at their central portions, means for seating the base bar on and engaging it to the top of an automobile, the ends of the top bar structure being adapted to normally position themselves above and separated from the base bar, but adapted for manual depression into substantial alignment with, and adjacent to, the base bar, and means for releasably securing the top bar ends in said depressed adjacent position, said central interengagement of the base bar and top bar structure comprising a rod, the base bar and top bar structure being mounted on said rod at their longitudinal centers, the top bar structure being vertically slidable along the rod, adjustment means at the top of the rod and a resilient member carried by the rod and bearing against the adjustment means and the top bar structure.

5. An auto top ski carrier unit comprising a base bar and a top bar structure, at least one of which is resilient, interengaged at their central portions, the ends of the base bar being looped, the loops carrying resilient suction cups adapted to seat on the top of an automobile, means for engaging the base bar to the top of an automobile, the ends of the top bar structure being adapted to normally position themselves above and separated from the base bar, but adapted for manual depression into substantial alignment with, and adjacent to, the base bar and means for releasably securing the top bar ends in said depressed adjacent position.

6. An auto-top ski carrier unit comprising a base bar and a top bar structure, at least one of which is resilient, interengaged at their central portions, means for seating the base bar and engaging it to the top of an automobile, a suction cup adapted for seating on the automobile top, a rod whose lower end is engaged to the top of the cup and which extends upward and slidingly through the base bar at its center portion, a resilient member associated with said rod and adapted to resiliently resist the movement of the bar toward the cup, the ends of the top bar structure being adapted to normally position themselves above and separated from the base bar, but adapted for manual depression into substantial alignment with, and adjacent to, the base bar and means for releasably securing the top bar ends in said depressed adjacent position.

7. An auto-top ski carrier unit comprising a base bar and a top bar structure, at least one of which is resilient, interengaged at their central portions, means for seating the base bar on and engaging it to the top of an automobile, the top bar structure comprising two bars each hinged at one end to the central interengaging means for vertical swinging of the bars on the hinge and means for holding said bars aligned, vertically, with the base bar, the ends of the top bar structure being adapted to normally position themselves above and separated from the base bar, but adapted for manual depression into substantial alignment with, and adjacent to, the base bar and means for releasably securing the top bar ends in said depressed adjacent position.

8. An auto top ski carrier unit comprising a base bar and a top bar structure, at least one of which is resilient, interengaged resiliently at their central portions, said central interengaging means including a member on which the top bar structure is vertically slidable and resilient means associated with said member and adapted to normally hold the central part of said top bar structure in close proximity to said base bar, means for resiliently seating the base bar on and resiliently securing it to the top of an automobile, the ends of the top bar structure being normally spaced above and away from the base bar but adapted for manual depression toward and releasably securing to the ends of the base bar.

9. An auto top ski carrier unit comprising a base bar and a top bar structure, at least one of which is resilient, interengaged resiliently at their central portions, the ends of the top bar structure being normally spaced above and away from the base bar but adapted for manual depression toward and releasably securing to the ends of the base bar, means for resiliently securing the base bar to the top of an automobile, and means for resiliently seating the base bar on the auto top comprising looped ends of said base bar, brackets carried by said looped ends and extending outwardly on each side of the bar and suction cups carried by each end of each bracket.

10. An auto top ski carrier unit comprising a base bar, means for seating the base bar on and engaging it to the top of an automobile, an arcuately-bowed resilient top bar centrally connected with and above the base bar in substantial alignment therewith, the bowed ends curving upwardly away from the base bar, each bowed end being adapted for manual depression to a position adjacent the base bar, and means for releasably securing the top bar ends in said depressed adjacent position.

MARCELLUS S. MERRILL.

REFERENCES CITED

The following references are of record in the file of this patent:

UNITED STATES PATENTS

| Number | Name | Date |
| --- | --- | --- |
| 1,222,458 | Peterson | Apr. 10, 1917 |
| 1,260,075 | Shaw | Mar. 19, 1918 |
| 2,171,053 | White et al. | Aug. 29, 1939 |
| 2,173,953 | Schwisow | Sept. 26, 1939 |
| 2,268,958 | Parten et al. | Jan. 6, 1942 |
| 2,315,387 | Bambenek et al. | Mar. 30, 1943 |
| 2,434,826 | Wubben | Jan. 20, 1948 |

FOREIGN PATENTS

| Number | Country | Date |
| --- | --- | --- |
| 317,704 | Italy | May 19, 1934 |
| 782,775 | France | Mar. 25, 1935 |
| 814,207 | France | Mar. 15, 1937 |
| 835,488 | France | Sept. 26, 1938 |